United States Patent

Nonami

[11] Patent Number: 5,278,866
[45] Date of Patent: Jan. 11, 1994

[54] RADIO COMMUNICATION APPARATUS WITH STORED CODING/DECODING PROCEDURES

[75] Inventor: Takayuki Nonami, Hyogo, Japan

[73] Assignee: Mitsubishi Denki Kabushiki Kaisha, Tokyo, Japan

[21] Appl. No.: 774,855

[22] Filed: Oct. 11, 1991

[30] Foreign Application Priority Data

Mar. 4, 1991 [JP] Japan .................. 3-061097

[51] Int. Cl.$^5$ ......................................... H04B 17/00
[52] U.S. Cl. ....................... 375/10; 371/21.1; 371/37.8
[58] Field of Search ....... 375/7–8; 375/10; 371/11.1, 37.8, 5.4–5.5, 371/11.3/21.1, 21.2

[56] References Cited

U.S. PATENT DOCUMENTS

| | | | |
|---|---|---|---|
| 4,271,517 | 6/1981 | Krauss | 371/37.8 |
| 4,686,690 | 8/1987 | Sato | 375/8 |
| 4,716,576 | 12/1987 | Sakai et al. | 375/8 |
| 4,775,987 | 10/1988 | Miller | 375/38 |
| 4,914,688 | 4/1990 | Kobayashi et al. | 375/8 |
| 4,924,456 | 5/1990 | Maxwell et al. | 375/8 |
| 5,170,470 | 12/1992 | Pindar et al. | 375/8 |

FOREIGN PATENT DOCUMENTS 61-198941  9/1986  Japan .

*Primary Examiner*—Curtis Kuntz
*Assistant Examiner*—Young Tse
*Attorney, Agent, or Firm*—Rothwell, Figg, Ernst & Kurz

[57] ABSTRACT

A radio communication apparatus for transmitting and receiving a digital signal using a radio line which includes a memory means for storing a plurality of signal procedures in which each procedure has different ratio of the information code bits and error correction code bits.

A signal processing circuit executes one of the procedures stored in the memory means according to line quality. Accordingly, the radio communication apparatus of the present invention selects the optimum procedure according to the line quality, and then reduces the consumed power.

3 Claims, 3 Drawing Sheets

| coding system | voice code : error correcting code | | operation quantity |
|---|---|---|---|
| A | 8 : | 5 | large |
| B | 10 : | 3 | middle |
| C | 12 : | 1 | small |

RADIO COMMUNICATION APPARATUS WITH STORED CODING/DECODING PROCEDURES

BACKGROUND OF THE INVENTION

1. Field of the Invention

The invention relates to a radio communication apparatus which is applicable to a mobile station in a digital mobile radio communication system.

2. Description of the Prior Art

FIG. 4 shows a block diagram of a conventional radio communication apparatus which is applied to a mobile station in a digital mobile radio communication system. In FIG. 4, an analog output voice signal from a microphone 1 is converted to a digital signal in a linear codec 3. A digital signal processor (DSP) 4 executes a coding process, a data compression process and an error correction process according to the voice coding procedure stored in a ROM 50 and outputs a coded data to a radio modem 6. The radio modem 6 modulates the coding data received from DSP 4 according to the indication from a control circuit 90, which controls the devices in the radio communication apparatus, and transmits the modulated radio signal to the base station (not shown) via an antenna 7.

In the case of receiving the radio signal from the base station, the input radio signal is input to the radio modem 6 via the antenna 7. The radio modem 6 demodulates the modulated signal and sends the demodulated signal to the DSP 4. The DSP 4 decodes the coded signal according to the voice decoding procedure stored in the a ROM 50. The control circuit 4 sends the decoded digital signal to the linear codec 3. The linear codec 3 converts the decoded digital signal to an analog signal and send it to the speaker 2. The speaker 2 converts the analog signal to a voice output.

A line quality monitor 8 measures the line quality of the received signal via radio modem 6 and sends the information regarding to the line quality to the control circuit 90. The control circuit 90 selects the signal coding/decoding procedures and other related parameters.

An example of the voice coding/decoding procedure is the Vector Sum Exited Linear Prediction (VSELP) system which is adapted in the U.S.A. digital cellular system according to the IS-54 regulation of Telecommunication Industry Association (TIS). In the above system, the code bit rate of the code data is 8 K bits per sec (Kbs) for voice coding and 5 Kbs for coding of the error correcting. Therefore the systems according to the regulation can maintain the voice quality above a certain standard level even if the line quality is very poor. But, in the above system, the error correcting code bit occupies a very large number of bits compared to the voice code bit.

As discussed above, this system is designed to be applied in a very poor line quality condition. Therefore, if the line quality is good, the systems has over-correction bits for the transmission signal. Accordingly, the system incorporates the excessive correcting capability and the DSP 4 consumes a large amount of power.

It is a primary object of the present invention to provide a radio communication apparatus which selects a suitable procedure according to the line quality.

It is further object of the present invention is to provide a radio communication apparatus which reduces the consumed power in the case of good line quality.

SUMMARY OF THE INVENTION

A radio communication apparatus for transmitting and receiving a digital signal using a radio line includes a memory means for storing a plurality of signal procedures in which each procedure has a different ratio of information code bits and error correction code bits, a signal processing circuit for executing a plurality of coding/decoding procedures stored in the memory means, a line quality monitor for supervising the radio line, a control circuit for selecting one of the coding/decoding procedures according to the result of the line quality monitor and for instructing the execution of the selected coding/decoding procedures to the signal processing circuit.

DETAILED DESCRIPTION OF THE PREFERRED EMBODIMENTS

Figure 1:
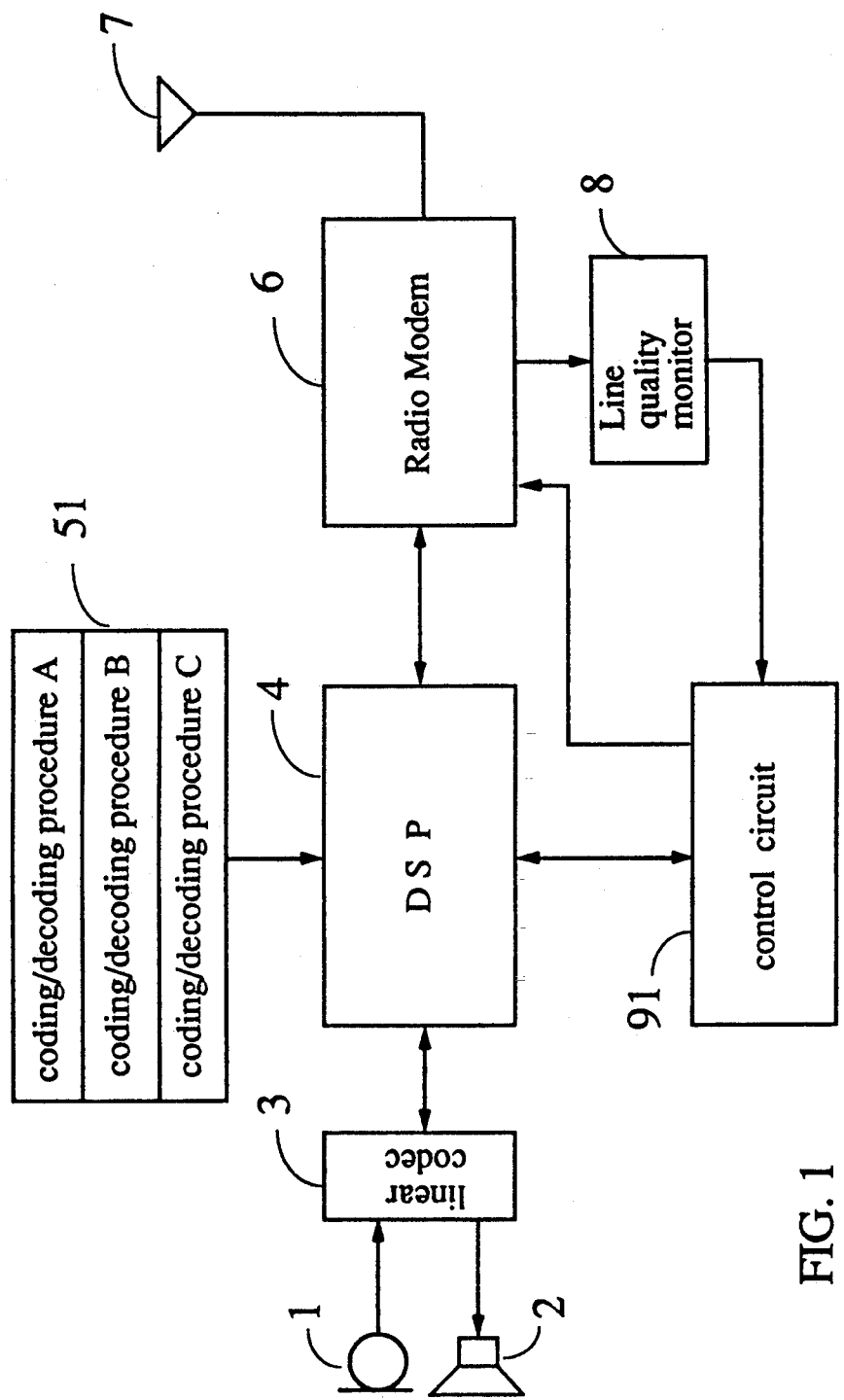
FIG. 1 is a block diagram of a first embodiment of a radio communication apparatus of the present invention.
Figures 2, 4:
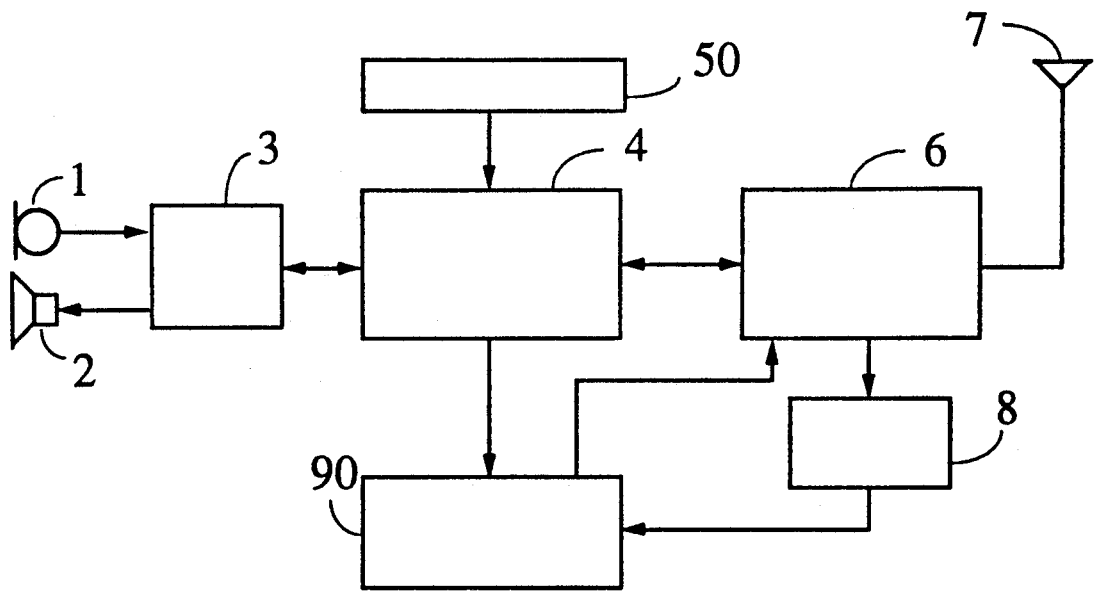
FIG. 2 shows a plurality of coding procedures in which each procedure has different ratio of the voice code bits and error correction code bits.
FIG. 4 is a block diagram of a conventional radio communication apparatus.

FIG. 1 shows a first embodiment of the present invention. In FIG. 1, a ROM 51 is provided which stores three voice coding procedures and in which the ratio of the information code bits and the error correcting code bits is different. A control circuit 91 executes voice coding procedures stored in the ROM 51 according to the line quality condition. In FIG. 1, the same reference numbers as used in the FIG. 4 are used to identify corresponding elements. Accordingly the detailed explanation of the portion is abbreviated in connection with the same reference numbers.

FIG. 2 shows three different voice coding procedures (A, B, C) which are stored in the ROM 51 of FIG. 1. In FIG. 2 each voice coding procedures shown as the different ratio of the voice code bits and error correction code bits which is selected by a digital signal processor DSP 4.

The voice coding procedure A has 8 Kbs for the voice code bit and 5 Kbs for the error correcting code bits. In this case, the error correcting bits occupies a considerably larger part of the total bits. The voice coding procedure B has 10 Kbs for the voice code bit and 3 Kbs for the error correcting code bits. The voice coding procedure C has 12 Kbs for the voice code bit and 1 Kbs for the error correcting code bits. In this case, the error correcting bits occupies a fairly smaller part of the total bits. In the case of B, the error correcting bits occupies a medium part of the total bits. DSP 4 must perform more operations with increases of the error correcting bits, which consumes more operational power.

The operation of the first embodiment is explained hereinafter with reference to FIG. 1 and FIG. 2. In FIG. 1, an analog output voice signal from the microphone 1 is converted to a digital signal in linear codec 3. A digital signal processor (DSP) 4 executes different kinds of voice coding procedure according to the voice coding procedures stored in a ROM 51 and outputs the coded signal to a radio modem 6. The radio modem 6 modulates the coded data received from DSP 4 and transmits the modulated radio signal to the base station (not shown) via the antenna 7.

In this system, a line quality monitor 8 supervises the line quality of the received signal via radio modem 6 and sends the line quality information to the control circuit 91. The control circuit 91 selects the best mode from the voice coding procedures stored in the ROM 51 corresponding to the line quality. The control circuit 91 also transmits the selected information to the base station via radio modem 6. If the response from the base station is affirmative, the control circuit 91 of the mobile station instructs to DSP to switch to the corresponding voice coding procedure. The DSP 4 selects the corresponding procedure according to the instruction received from the control circuit 91. Then the DSP 4 executes one of the voice coding procedures. More precisely, The DSP 4 executes the voice coding procedure A when the line quality is good, the voice coding procedure C when the line quality is bad, and the voice coding procedure B when the line quality is medium.

The supervision process can be also executed at the base station. In this situation, the supervisory monitor provided in the base station supervises line quality of the received signal level from the base station. If the supervisory monitor decides that the mobile station needs to switch the voice coding procedure, the selection information is transmitted from the base station to the mobile station. The mobile station switches the voice coding procedure of the mobile station, after the synchronization process is executed between the base station and the mobile station.

In the above embodiment, the voice coding procedures are each independent from other voice coding procedures. Therefore all procedures for coding the voice signal must be switched each time other voice coding procedures are selected. However, common procedures can be used without being switched between a plurality of the voice coding procedures, if there are some common procedures in the voice coding procedures.

In the above embodiment, the voice coding procedures are described in one application, but the present invention may be applied to in other system of data transmission, for example, facsimile transmission which does not use voice signals. In each case, the data procedure is stored in the ROM 51.

Figure 3:
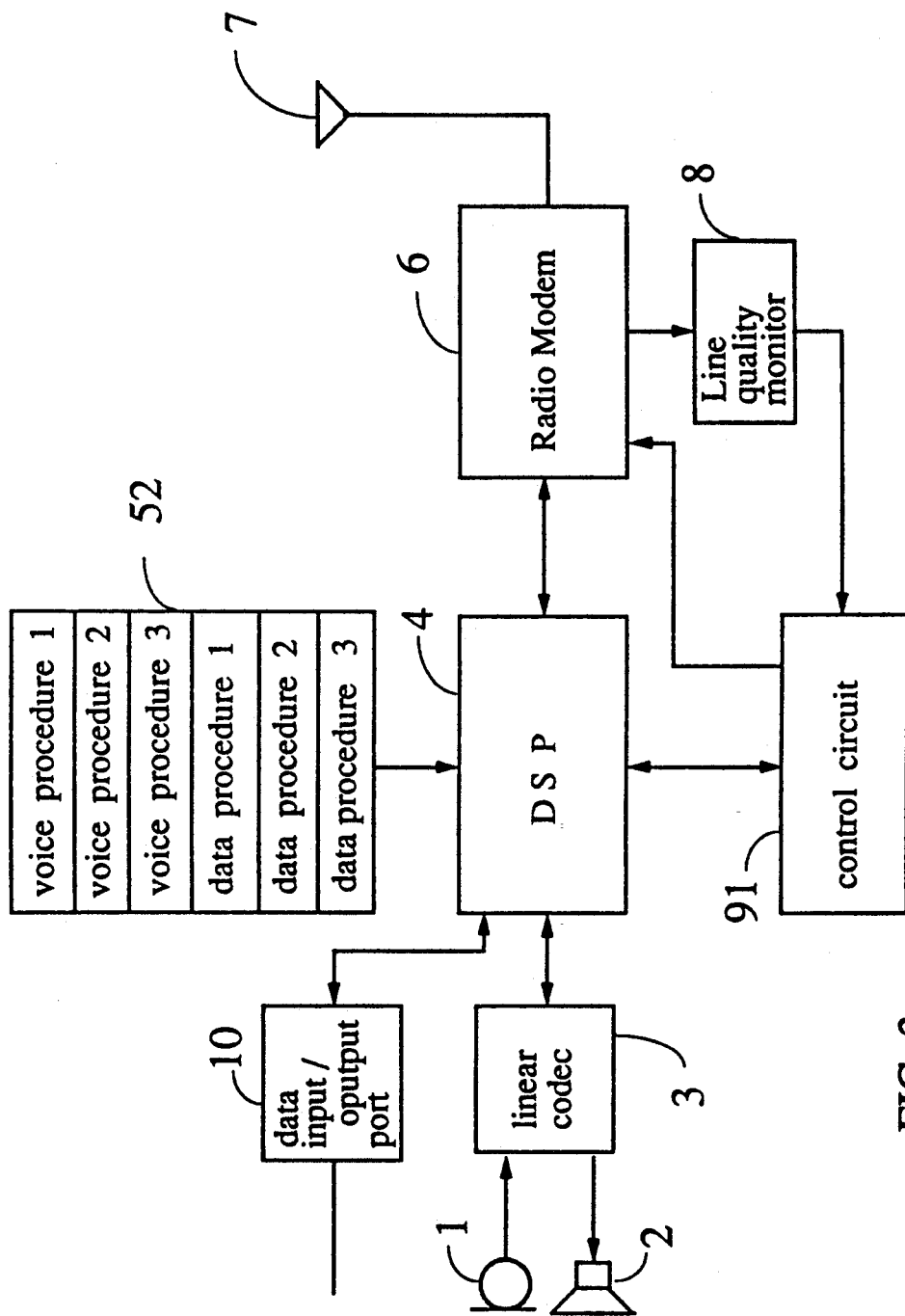
FIG. 3 is a block diagram of a second embodiment of a radio communication apparatus of the present invention.

FIG. 3 is a block diagram of a second embodiment of a radio communication apparatus of the present invention in which reference numerals for common elements are the same as those used in FIG. 1. In FIG. 3, a data input/output port 10 is connected to external devices, such as personal computer, and with the mobile station through DSP 4. A ROM 52 stores a plurality of kinds of data procedures as well as voice coding procedures. In this case, the mobile station operates in a selected condition, as the data signal is processed in the mobile station according to the line quality. In this construction, the radio communication apparatus of the present invention can select the suitable procedures stored in the ROM according to the line quality and operates in the optimum condition from the stand point of consumed power.

In the above embodiments, radio communication apparatus is described for the application shown, but the present invention can also be applied for other communication apparatus.

What is claimed is:

1. A radio communication apparatus for transmitting and receiving a digital signal using a radio line comprising:
   a memory means having stored therein a plurality of coding/decoding procedures in which each procedure has a different ratio of the information code bits and error correction code bits;
   a signal processing circuit for executing selected ones of said plurality of coding/decoding procedures stored in said memory means;
   a line quality monitor for generating line quality information and for supervising said radio line;
   a control circuit connected to receive said line quality information from said line quality monitor and to control said signal processing circuit for selecting one of said coding/decoding procedures responsive to the line quality information generated by said line quality monitor to minimize the number of error correction code bits required based on said line quality information and for instructing the execution of the selected coding/decoding procedures by said signal processing circuit.

2. The radio communication apparatus for transmitting and receiving a digital signal using radio line of claim 1, wherein said memory means stores a plurality of voice coding/decoding procedures in which each procedure has different ratio of the voice code bits and error correction code bits.

3. The radio communication apparatus for transmitting and receiving a digital signal using radio line of claim 1, wherein said memory means stores a plurality of data transmission procedures in which each procedure has different ratio of the information code bits and error correction code bits.

* * * * *